United States Patent [19]

Wille et al.

[11] Patent Number: 5,579,385
[45] Date of Patent: Nov. 26, 1996

[54] METHOD OF SIGNALLING SUBSCRIBER NUMBERS IN A TELECOMMUNICATIONS NETWORK

[75] Inventors: Klaus Wille; Karl-Heinz Martin; Christian Kofler, all of München, Germany

[73] Assignee: Siemens Aktiengesellschaft, Munich, Germany

[21] Appl. No.: 313,174

[22] PCT Filed: Mar. 25, 1993

[86] PCT No.: PCT/DE93/00278

§ 371 Date: Sep. 29, 1994

§ 102(e) Date: Sep. 29, 1994

[87] PCT Pub. No.: WO93/21031

PCT Pub. Date: Oct. 28, 1993

[30] Foreign Application Priority Data

Mar. 30, 1992 [DE] Germany ............... 42 10 407.6

[51] Int. Cl.⁶ .................................................. H04M 7/00
[52] U.S. Cl. .................................... 379/221; 379/207
[58] Field of Search .................. 370/110.1, 58.1, 370/58.2, 68.1; 379/142, 127, 219, 220, 221, 229, 230, 238, 240, 245, 247, 248, 202, 207, 211

[56] References Cited

U.S. PATENT DOCUMENTS

| | | | |
|---|---|---|---|
| 4,791,665 | 12/1988 | Bogart et al. | 379/207 |
| 4,811,334 | 3/1989 | Matt | 370/60 |
| 4,903,258 | 2/1990 | Kuhlmann et al. | 370/60 |
| 4,914,689 | 4/1990 | Quade et al. | 379/245 |
| 4,998,248 | 3/1991 | Matsuzaki | 370/110.1 |
| 5,008,884 | 4/1991 | Yazawa et al. | 370/110.1 |
| 5,018,097 | 5/1991 | Kuhlmann et al. | 395/700 |
| 5,047,923 | 9/1991 | Elstner et al. | 395/600 |
| 5,337,352 | 8/1994 | Kobayashi et al. | 379/221 |
| 5,373,553 | 12/1994 | Mintz et al. | 379/220 |
| 5,377,262 | 12/1994 | Bales et al. | 379/220 |
| 5,390,242 | 2/1995 | Bales et al. | 379/207 |
| 5,404,395 | 4/1995 | Bogart et al. | 379/207 |
| 5,422,938 | 6/1995 | Yamannishi | 379/142 |
| 5,434,914 | 7/1995 | Fraser | 379/220 |
| 5,475,678 | 12/1995 | Gass et al. | 379/230 |
| 5,483,589 | 1/1996 | Ishida et al. | 379/207 |

FOREIGN PATENT DOCUMENTS 57-132467  11/1982  Japan.

OTHER PUBLICATIONS

Siemens "Hicom 300 System Product Data", Ordering No. A19100–K3161–430–X–7600, pp. 55/56.

Siemens "Private Kommunikationssysteme, Hicom schafft Verbindungen"[Private communications systems, Hicom makes connections], Ordering No. A19100–K3160–A302, Hicom 300 Networking.

Siemens Aktiengesellschaft Private Communication Systems and Networks Division: "CorNet Signaling for ISDN Communication in Corporate Networks", Ordering No. A19100–K3110–G284–X–7600, Berlin and Munich 1987; "CorNet functional specification", pp. 1–50.

(List continued on next page.)

*Primary Examiner*—Douglas W. Olms
*Assistant Examiner*—Seema S. Rao
*Attorney, Agent, or Firm*—Hill, Steadman & Simpson

[57] ABSTRACT

In the telecommunication network, telecommunication connections are directed from telecommunication terminal equipment on the transmission side (A) via an origin node (ON), via transit nodes (TN1, . . . TN7) to telecommunication terminal equipment on the reception side (B). An origin node number, the A call number, the destination node identity number and also the B call number are inserted into signalling information of the connection to be set up. In the nodes involved in the setup of the connection it is checked whether the A call number is to be modified. In some cases, the A call number may be supplemented and in other cases it may be supplemented and abbreviated.

6 Claims, 8 Drawing Sheets

OTHER PUBLICATIONS

Conference Record, IEEE Global Telecommunications Conference, N. Shigematsu, et al., "The Advanced Network Service System", Dec. 1985, pp. 1429–1433.

NTZ Nachrichtentechnische Zeitschrift, R. P. Loretan, "Flexible Numbering of Telephones over whole Area with Dispersed Translators", vol. 28, No. 7, Jul. 1975, pp. 236–238.

Groupe des Ingenieurs du Secteur Commutation du CNET, vol. 2, "Electronic Switching", 1983, The Telephone Network, pp. 41 and 42.

British Telecommunications Engineering, vol. 8, Jan. 1990, N.A.C. McLeod, "Numbering In Telecommunications", pp. 225–231.

Bergmann, Lehrbuch der Fernmeldetechnik, Berlin 1986, Band 1, pp. 600–609 and Band 2, pp. 1586–1591.

Bergmann, Lehrbuch der Fernmeldetechnik, Berlin 1986, Band 1, p. 206.

| TN6 (26) ON\DN | ... 20 ... 28 |
|---|---|
| ⋮ | |
| A  20 | ⊖ |
| B  28 | ⊖ |

FIG 4e

| DN (28) ON\DN | ... 20 ... 28 |
|---|---|
| ⋮ | |
| A  20 | ⊖ |
| B  28 | ⊕98 |

FIG 5a

| ON (20) | DN / ON | ... 20 ... | 28 |
|---|---|---|---|
| A | 20 | | ⊖ |
| B | 28 | ⊖ | |

FIG 5b

| TN2 (22) | DN / ON | ... 20 ... | 28 |
|---|---|---|---|
| A | 20 | | ⊖ |
| B | 28 | ⊖ | |

FIG 5c

| TN4 (24) | DN / ON | ... 20 ... | 28 |
|---|---|---|---|
| A | 20 | | +90 |
| B | 28 | −90 | |

METHOD OF SIGNALLING SUBSCRIBER NUMBERS IN A TELECOMMUNICATIONS NETWORK

BACKGROUND OF THE INVENTION

In telecommunication networks there are two methods of numbering, that is to say of identifying subscriber lines, switching centers or network areas: closed numbering and open numbering. In the case of closed numbering, the identity number of the switching centers is combined with the ordinal number of the associated subscriber lines, that is to say the identity number of the switching center is a fixed component part of the subscriber call number, it is contained therein in concealed form. In the case of open numbering, the numbering areas of the network are identified by a sequence of digits which are to be dialed in addition to the subscriber call numbers when setting up a connection between the network areas (Bergmann, Lehrbuch der Fernmeldetechnik [Textbook of telecommunication engineering], Volume 1, 5th edition, Berlin 1986, page 206). Heterogeneous networks in which call numbers are signaled by the open method in individual areas and by the closed method in other areas are also known.

In private and public ISDN networks, when setting up a connection the call number of the calling (A) subscriber is signaled to the called (B) subscriber. The call number of the A subscriber is required for implementing various facilities, inter alia for call number indication on a display of the terminal equipment on the reception side (B), for call-back when free and for redialing by the B subscriber. In continuously open numbering networks, when setting up a telecommunication connection which is routed from an origin node, via transit nodes, to a destination node, the A call number is to be supplemented by the identity number of the A terminal equipment. This supplementing is required, for example, in order that all the dialed digits which are to be entered into the B terminal equipment in order to reach the A terminal equipment are indicated on the display of the B terminal equipment. If, on the other hand, the origin node and following nodes lie in an area of closed numbering, in the origin node the A call number is not to be supplemented by the identity number of the origin node or the identity number of the area of closed numbering.

If the telecommunication connection is routed out of the area of closed numbering from the origin node into an area of open numbering, which comprises for example a plurality of transit nodes, the signalling information of the connection to be set up is supplemented by a node-individual identity number in each node involved in the setup of the connection in the area of open numbering. Depending on the number of nodes involved in the setup of the connection and depending on the number of digits of the node-individual identity numbers, the call number information may in this case comprise many digits in addition to the call number part which is individual to the terminal equipment. The display of such a supplemented call number presupposes a corresponding dimensioning of memories which have to be accessed by the corresponding display control. It must be taken into consideration here that, for example for implementing the facilities "call-back when free" and "redialing by B subscriber", use of the identity numbers supplemented by the identity numbers of the nodes involved in the original setup of the connection would lead to the following connection being routed via the nodes via which the original connection was routed. However, this would only be appropriate if the network were not to permit a routing any more favorable for call handling at the time at which the following connection is set up than at the time at which the original connection was set up.

The described problems in the case of the prior art could be avoided if a line were to be installed from the area of closed numbering to the destination node and the connection would be set up over this line. However, this would require considerable expenditure, in particular if origin node and destination node are at locations which are far apart. This possibility is virtually ruled out if the origin node and destination node are in different continents (Europe/USA).

The product publications of Siemens AG "Hicom 300 System Produkt Data" [Hicom 300 Systems Product Data], ordering No. A19100-K3161-430-X-7600, pages 55/56 and "Private Kommunikationssysteme, Hicom schafft Verbindungen" [Private Communication Systems, Hicom Creates Connections], ordering No. A19100-K3160-A302, page on "Hicom 300 Networking" discloses a communication system ("Hicom 300") which can form a network node in an area of open numbering or closed numbering. In such a network, signalling information on telecommunication connections to be set up is formed and an identity number designating the concealed area (receiving the origin node) and the call number of the telecommunication terminal equipment on the transmission side are inserted into this information. In the signalling information, the call number of the telecommunication terminal equipment on the transmission side is supplemented by identity numbers of the nodes involved in the setup of the connection, so that the disadvantages described above arise.

SUMMARY OF THE INVENTION

The invention is based on the object of specifying a process for call number signalling which permits simplified evaluation for telecommunication terminal equipment on the reception side.

This object is achieved according to the invention by a process for signalling the call number in a telecommunication network, telecommunication connections being directed from telecommunication terminal equipment on the transmission side via an origin node, via transit nodes to telecommunication terminal equipment on the reception side. The origin node is arranged in an area of closed numbering. There is inserted into first signalling information of the telecommunication connection to be set up a node number designating the origin node, the call number of the telecommunication terminal equipment on the transmission side, a node identity number assigned to the telecommunication terminal equipment on the reception side and entered into the telecommunication terminal equipment on the transmission side, and the call number of the telecommunication terminal equipment of the reception side. In nodes involved in the setup of the connection it is checked on the basis of the node number of the origin node and on the basis of the identity number of the destination node whether the call number of the telecommunication terminal equipment on the transmission side is to be modified. The call number of the telecommunication terminal equipment on the transmission side is supplemented in a node in the area of closed numbering which neighbors an area of open numbering by the identity number designating the area of closed numbering and is not supplemented in the nodes of open numbering following the area of closed numbering by the identity numbers designating these nodes.

After the setup of the telecommunication connection from the telecommunication terminal equipment on the transmission side to the telecommunication terminal equipment on the reception side, second signalling information is formed, which is transmitted from the telecommunication terminal equipment on the reception side to that on the transmission side with the call number of the telecommunication terminal equipment on the reception side. In the nodes involved in the setup of the connection it is checked on the basis of the identity number of the destination node and on the basis of the node number of the origin node whether the call number of the telecommunication terminal equipment on the reception side is to be modified. The call number of the telecommunication terminal equipment on the reception side is supplemented in the destination node, representing the second signalling information, provided that this node is a node of open numbering, by the identity number designating this node and is not supplemented in the nodes following this node with respect to the second signalling information.

Provided that the origin node and the destination node are assigned to an area of the same identity number and provided that there is at least one area of another identity number arranged between the two nodes, the first signalling information with the call number of the telecommunication terminal equipment on the transmission side, supplemented by the area identity number of the origin node, is abbreviated in the destination node, or in a node preceding the destination node and assigned to the area of the destination node, by the area identity number of the origin node.

After the setup of the telecommunication connection from the telecommunication terminal equipment on the transmission side to the telecommunication terminal equipment on the reception side, the second signalling information is checked in the nodes involved in the setup of the connection on the basis of the identity number of the destination node and on the basis of the node number of the origin node to ascertain whether the call number of the telecommunication terminal equipment originally on the reception side is to be modified. The call number of the telecommunication terminal equipment on the transmission side is modified in the transmission of the second signalling information such that the call number of the telecommunication terminal equipment on the transmission side is routed to the telecommunication terminal equipment on the reception side without abbreviations or supplements.

To be regarded first of all as an advantage of the way in which the object is achieved according to the invention is that the hardware configuration of the network does not have to be changed. In particular, no line or line group has to be installed between origin node and destination node. It is to be regarded as a further advantage of the way in which the object is achieved according to the invention that the display controls tied in with the call number signalling, or the control program assigned to the said controls, and the memory devices to receive the information to be indicated can be taken over unchanged.

The invention can also be applied to network structures in which origin node and destination node are arranged in an area with the same identity number, although there is at least one area of a different identity number arranged between origin node and destination node.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
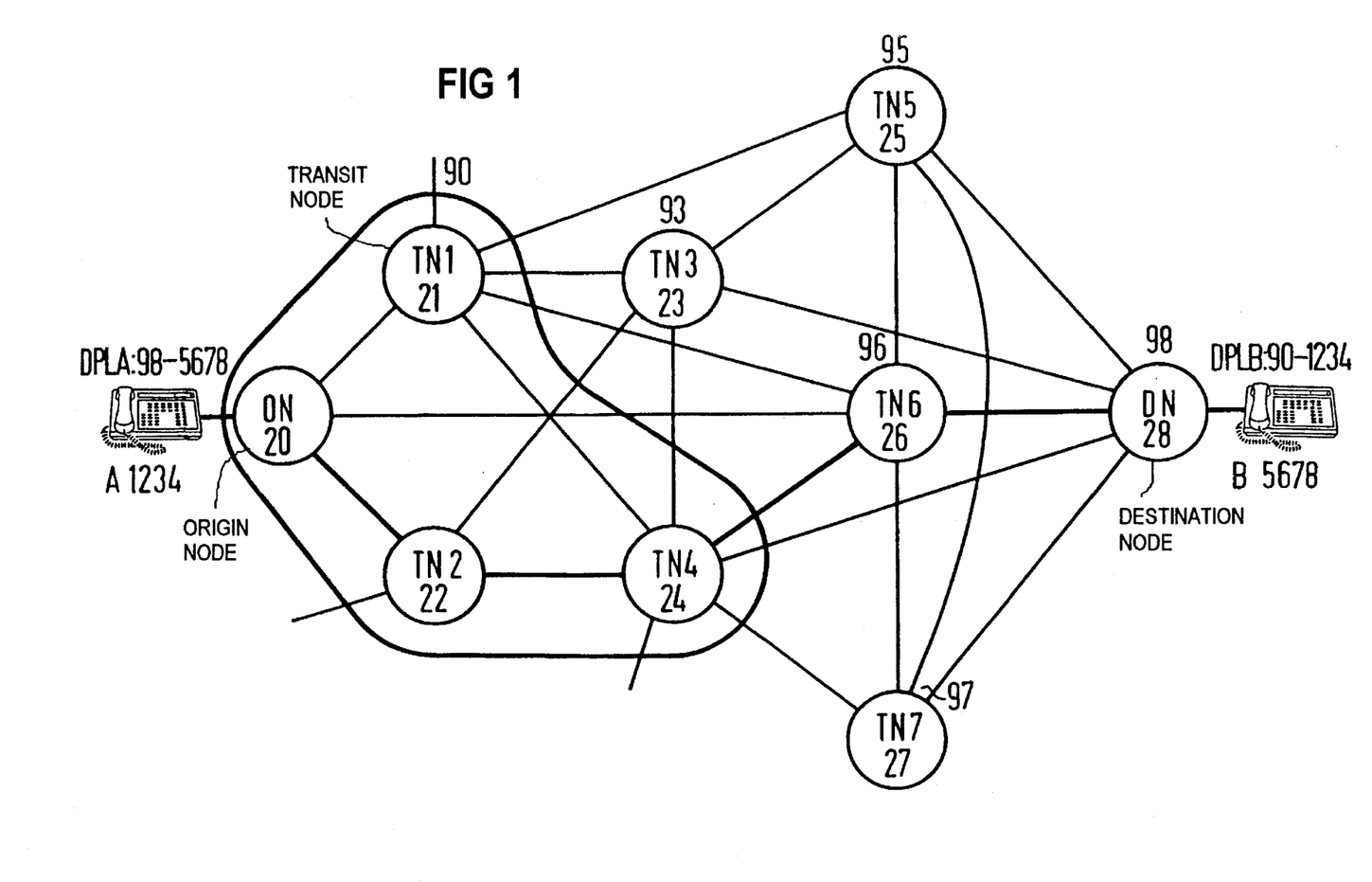
FIG. 1 shows a heterogeneous network with areas of open numbering and areas of closed numbering, in which the call number signalling according to the invention takes place.

In FIG. 1 there is represented a meshed network with a plurality of nodes, with telecommunication equipment on the transmission side (A) (for example a telephone set or a fax machine), and with telecommunication equipment on the reception side (B). With regard to a telecommunication connection which is to be set up from A to B, the network nodes have the function of an origin node ON (Origin Node), of transit nodes TNx (Transit Node) and of a destination node DN (Destination Node). The network comprises, for example, 7 transit nodes TN1 ... TN7, which are interconnected, as indicated in FIG. 1. Consequently, a telecommunication connection between A and B can be established over various routes: for example over the route ON-TN6-DN, ON-TN2-TN4-DN and ON-TN2-TN3-TN5-TN7-TN6-DN.

The nodes ON, TN1, ... TN7, DN are assigned individual node numbers 20 ... 28. The nodes ON (20), TN1 (21), TN2 (22) and TN4 (24) are arranged in an area of closed numbering. This area is assigned the identity number 90. In the remaining network nodes TN3 (23), TN5 (25), TN6 (26), TN7 (27) and DN (28), call numbers are numbered in open form. These nodes are assigned the individual identity numbers 93, 95, 96, 97 and 98.

In FIG. 1, the node numbers are indicated in the circles symbolically representing the nodes underneath the node names ON, TN1, ... TN7, DN. The area identity number 90 is indicated above the line which symbolically represents the area; the node identity numbers 93, 95, ... are indicated above the circles representing the nodes.

The term of the "node number" designates an operational datum fixed throughout the network. While the origin node number is transmitted in cross-node traffic, the node numbers of the remaining nodes involved in the setup of the connection are not transmitted. These node numbers may be used in conjunction with the process according to the invention for node-internal checks still to be described. The term of the "identity number" on the other hand designates a dialed digit, or a combination of dialed digits, which is to be chosen in cross-node traffic with open signalling and is to be used as a prefix for the actual terminal equipment call number. The checks performed in the case of the process according to the invention in the nodes involved in the setup of the connection may take place on the basis of the respectively available identity numbers and/or node numbers, depending on the network protocol used and the control program of the network node controls.

It is now assumed that a telecommunication connection is being set up from A via the nodes ON (20), TN2 (22), TN4 (24), TN6 (26), DN (28) to B. Let the call number of A be 1234 and the call number of B be 5678; let the destination node DN have the node identity number 98. The nodes ON (20), TN2 (22) and TN4 (24) are arranged in an area of closed numbering, to which the area identity number 90 is assigned. The remaining node DN involved in the setup of the connection is assigned the node identity number 98.

Figure 3:
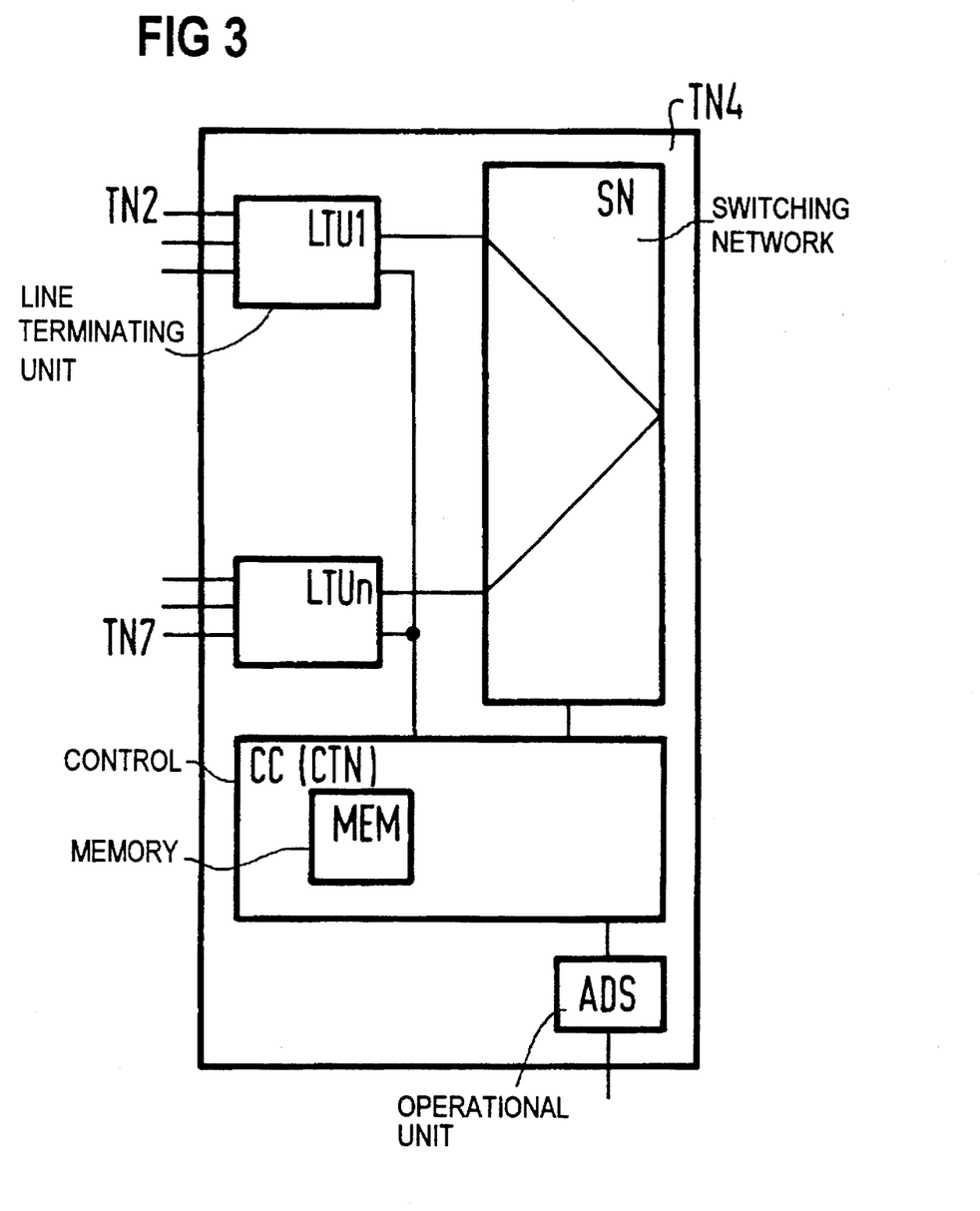
FIG. 3 shows a block diagram of a node in a network according to FIG. 1 or 2, FIGS. 4a–4e show tables which are assigned to nodes in the network according to FIG. 1, FIGS. 5a–5f show tables which are assigned to nodes in the network according to FIG. 2.
Figure 4A:
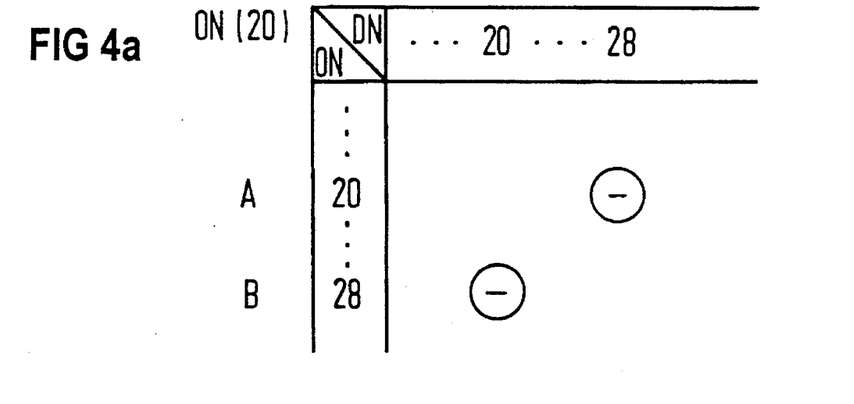

For dialing B, the dialed digits 98 5678 are entered into the terminal equipment A. In addition to the A call number (1234), the origin node number (20) and the dialed B call number, including the (destination) node identity number (98 5678), are inserted in a way known per se into the signalling information of the telecommunication connection to be set up. In each node involved in the setup of the connection it is then checked whether, and if so in what way, the A call number (1234) is to be modified. This check takes place on the basis of the origin node number (20) and also on the basis of the (destination) node identity number (98). In the network nodes, the assignment of (destination) node identity numbers and destination node numbers is stored. The first network node involved in the setup of the connection is the origin node (ON), which is arranged in an area of closed numbering. The control of the origin node (CTN, cf. FIG. 3) initially forms from the (destination) node identity number (98) the destination node number (28) and then consults the call number modification table stored in the node (FIG. 4a). This table indicates according to the origin node number (here 20) and according to the destination node number (here 28) whether, and if so in what way, the A call number or the B call number (origin node number 28 and destination node number 20, is to be modified. In the present case it follows from the check performed for the A call number that the A call number is not to be modified owing to the arrangement of the origin node in an area of closed numbering (FIG. 4a: row "20", column "28").

Figure 4B:
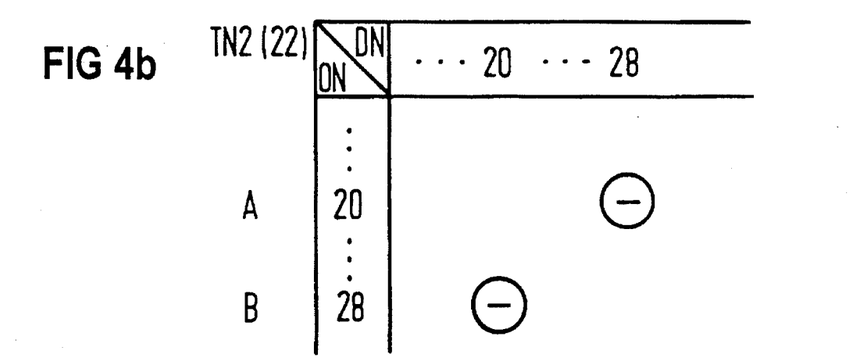

The telecommunication is then routed from the origin node "20" to the transit node "22". Like the origin node, the transit node "22" is arranged in the same area of closed numbering, it is also not neighboring an area or node of open numbering. The call number modification table is therefore configured for this node "22" like for the node "20", as is described below. As the control of the origin node before it, the control of this node (CTN, cf. FIG. 3) forms from the (destination) node identity number (98) the destination node number (28) and consults the call number modification table stored in the node (FIG. 4b). In the present case it follows from the check performed for the A call number that the A call number is likewise not to be modified (FIG. 4b: row "20", column "28"). The signalling information thus does not undergo any modification at the exit of the area of closed numbering; the A call number 1234 is neither supplemented nor abbreviated.

Figure 4C:
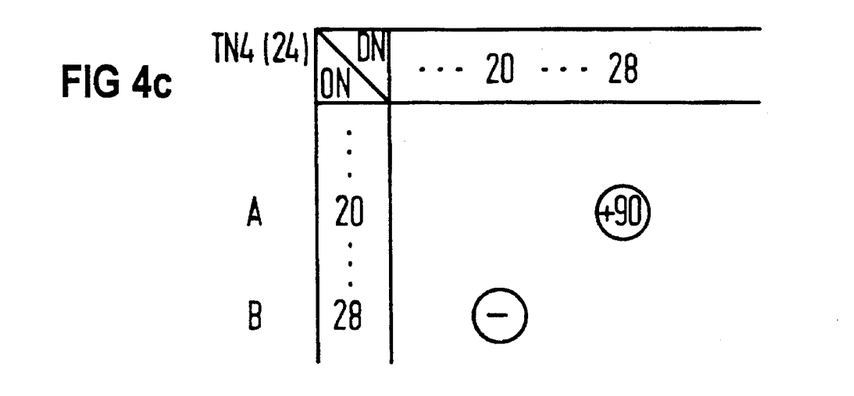

The telecommunication connection is then routed to the transit node "24". Like the origin node "20" and the transit node "22", the transit node "24" is arranged in the same area of closed numbering, although—unlike the nodes "20" and "22"—it is also neighboring an area or node TN6 of open numbering. For this reason, the call number modification table for this node "24" is configured differently from the corresponding tables in the nodes "20" and "22", as is described below. As the control of the origin node "20" or of the transit node "22" before it, the control of this node (CTN, cf. FIG. 3) forms from the (destination) node identity number (98) the destination node number (28) and consults the call number modification table stored in the node (FIG. 4c). In the present case it follows from the check performed for the A call number that the A call number is to be modified, namely by the area identity number "90", which is to be supplemented ("+") (FIG. 4c: row "20", column "28"). The signalling information thus undergoes a modification at the output of the area of closed numbering; the A call number 1234 is supplemented by the identity number "90" of the area of closed numbering.

Figure 4D:
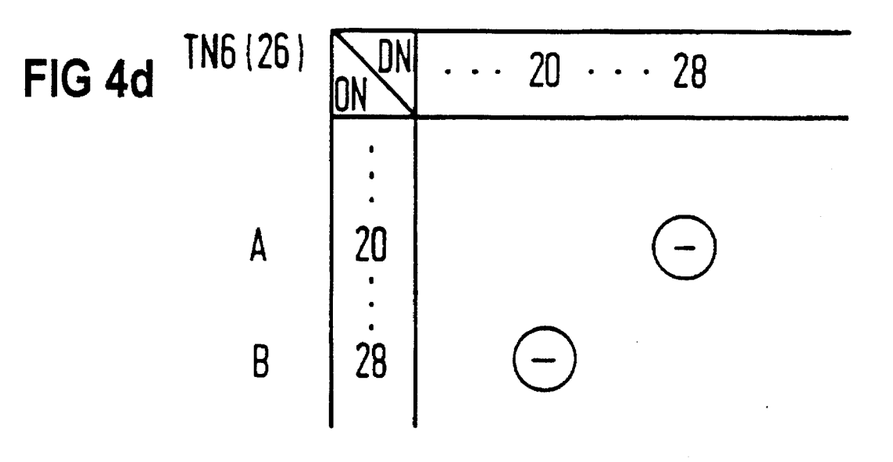
Figure 4E:
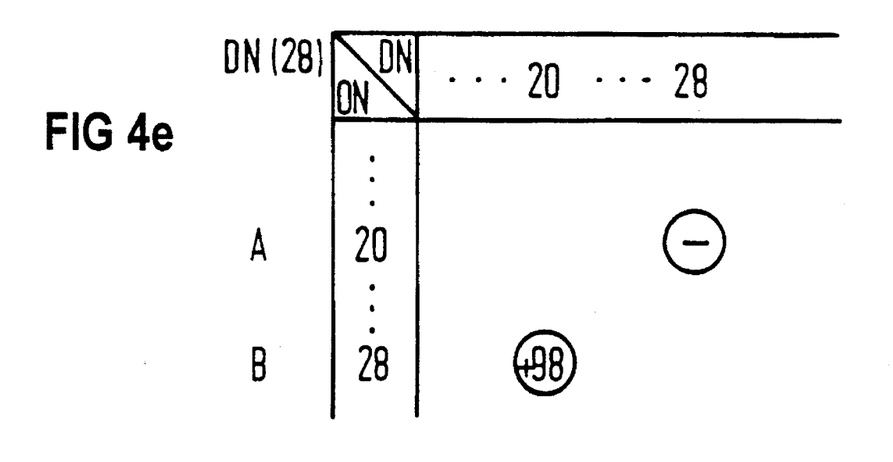

The remaining nodes involved in the setup of the connection, nodes TN6 and DN, are nodes of open signalling. The call number modification tables assigned to these nodes (FIGS. 4d and 4e) are configured in such a way that the A call number is not modified. The respective control CTN (cf. FIG. 3) of the nodes TN6 or DN thus carries out the corresponding checks, with the result that the A call number 1234 contained in the signalling information and already supplemented by the area identity number "90" is not supplemented by the respective node identity number "96" or "98". The A call number 1234 supplemented only by the area identity number "90" is thus fed to the telecommunication terminal equipment on the reception side B, where it is available for indication on a display DPLB or for the implementation of other facilities. The A call number is thus made available to the terminal equipment on the reception side irrespective of the nodes of open numbering passed through.

The return signalling of the B call number from the terminal equipment B to the terminal equipment A takes place in an analogous way, noting that the "destination node" (28) of the setup of the connection is identical to the "origin node" (28) of the return signalling and that the "origin node" (20) of the setup of the connection is identical to the "destination node" (20) of the return signalling. The return signalling takes place via the nodes involved in the setup of the connection (20-22-24-26-28), although in the reverse order (28-26-24-22-20). The controls of the nodes involved in the return signalling carry out the checks described in conjunction with the setup of a connection and in each case consult the call number modification tables stored in the nodes (FIGS. 4d, 4c, 4b and 4a: row "28", column "20"). It follows that the B call number contained in the (return) signalling information is supplemented only in the node "28" by the node identity number "98". The telecommunication terminal equipment on the transmission side A is thus fed the B call number 5678 supplemented only by the node identity number "98", where it is available for indication on a display DPLA or for the implementation of other facilities. The B call number is thus made available to the terminal equipment on the transmission side irrespective of the route actually taken.

The nodes are, in particular, communication systems which are disclosed in the published European Patent Applications EP 0306693 A1 (U.S. Pat. No. 4,903,258 hereby incorporated by reference), EP 0303870 A2 (U.S. Pat. No. 5,018,097 hereby incorporated by reference) and EP 0303869 A1 (U.S. Pat. No. 5,047,923 hereby incorporated by reference). In FIG. 3, only the components of the communication system required for an understanding of the invention are represented: this system comprises a control CC (CTN), a switching network SN and also line terminating units LTU1 . . . LTUn. These line terminating units comprise subscriber line circuits and trunk circuits. The subscriber line circuits are subscriber-oriented device connections, such as for example ISDN basic accesses for digital monofunctional and multifunctional terminal devices. The trunk circuits serve for connection with public and/or private networks and are, for example, ISDN basic accesses for ISDN outside traffic and ISDN internet traffic.

The subscriber line circuits and trunk circuits have the same system-internal interfaces. They couple the individual basic channels, on which user data, i.e. voice and/or data information, are transmitted, to any desired selection of 2 multiplex channels with, for example, 32 channels of the switching network SN and transfer the signalling information transmitted into a control channel as the HDLC protocol to the control CC (CTN). This control is assigned a memory MEM, in which the table information indicated in FIGS. 4a–4e and FIGS. 5a–5f is stored. The table information can be configured in particular by means of operational commands, which are to be entered into an operational unit ADS. The communication system represented in FIG. 3, which for example forms the node TN4, establishes connections, inter alia, with neighboring nodes, for example with the nodes TN2 and TN7.

Figure 2:
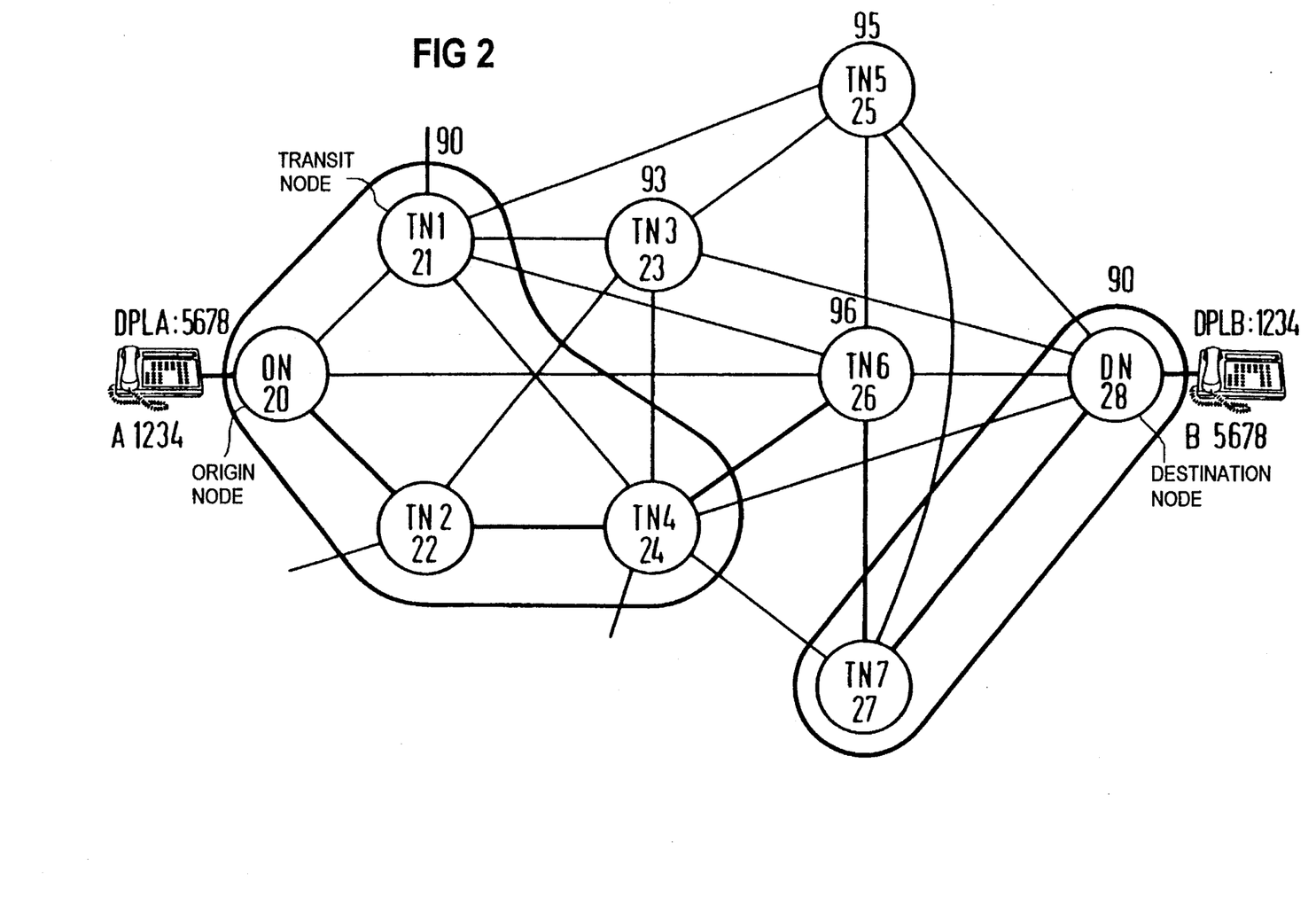
FIG. 2 shows a network in which origin node and destination node are arranged in an area of the same identity number, although there is at least one area of a different identity number arranged between origin node and destination node.
Figure 6:
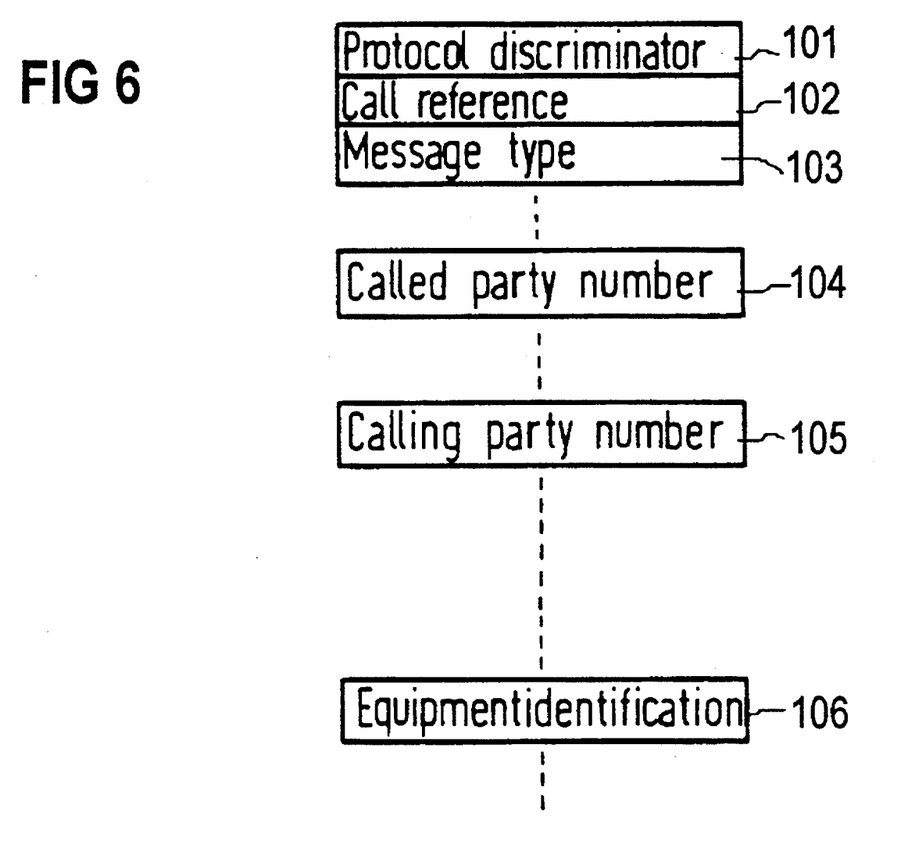
FIG. 6 shows the structure of the signalling information formed by the nodes according to FIGS. 1 to 3.

The meshed networks represented in FIGS. 1 and 2 may be, for example, networks for which the known CorNet Protocol is implemented (Siemens Aktiengesellschaft Private Communication Systems and Networks Division: "CorNet Signalling for ISDN Communication in Corporate Networks", ordering No. A19100-K3110-G284-X-7600, Berlin and Munich 1987; "CorNet functional specification"). The message for the setup of the connection ("setup message") may in this case be structured as in FIG. 6. This message in this case comprises the following information elements: Protocol discriminator, Call reference, Message type, . . . Called party number, . . . Calling party number, . . . Transit counter, . . . Equipment identification . . .

The information element "Protocol discriminator" indicates the type of protocol, for example CorNet; "Call reference" designates a consecutive process number and "Message type" designates the type of signalling message, here: "Setup of a connection" (setup).

The "Called party number" (B call number) contains in addition to the actual call number the identity number (for example 98), which is assigned to the destination node DN (28).

The information element "Calling party number" designates the A call number, which in call number signalling with open numbering is supplemented by the identity number assigned to the origin node. If in the case of the process according to the invention the origin node number is not contained in the signalling information, or cannot be evaluated by a network node control, the latter converts the origin node identity number into the origin node number during the evaluation of the tables according to FIGS. 4a–4e and FIGS. 5a–5f.

The information element "Equipment identification" designates the node number (20) of the origin node. Furthermore, there may be an information element "Called party number". This is inserted into the return message ("Alert", "second signalling information") when the connection to B or (for example in the case of call diversion) to another device in the terminal equipment on the reception side has been set up. The information element designates the call number of B or of the other terminal device on the reception side.

FIG. 2 shows the network already represented in FIG. 1, with the special feature that the origin node (20) and the destination node (28) are arranged in an area of the same identity number (here 90), although an area of a different identity number (here 96) is arranged between origin node and destination node on the route over which the call is set up.

It is assumed that the connection is routed from A via the nodes ON (20), TN2 (22), TN4 (24), TN6 (26), TN7 (27) and DN (28) to B. In the case of the network represented in FIG. 2, the nodes ON (20), TN1 (21), TN2 (22) and also the nodes TN7 (27) and DN (28) are arranged in the area with the identity number "90". The nodes TN3 (23), TN5 (25) and TN6 (26) are nodes of open numbering; they are assigned the individual node identity numbers 93, 95 and 96.

In FIG. 5 a), b), c), d), e) and f) there are represented the call number modification tables for the nodes ON (20), TN2 (22), TN4 (24), TN6 (26), TN7 (27) and DN (28). The modification of the A call number in the nodes ON (20), TN2 (22), TN4 (24) and TN6 (26) takes place as described above with reference to FIGS. 1 and 4 a), b), c), d): accordingly, the A call number 1234 is initially modified only in the node TN4, which is arranged in the area of closed numbering and at the same time neighbors a node (TN6) of open numbering, namely it is supplemented by the area identity number "90" (FIG. 5c, row "20", column "28": "+90").

Figure 5A:
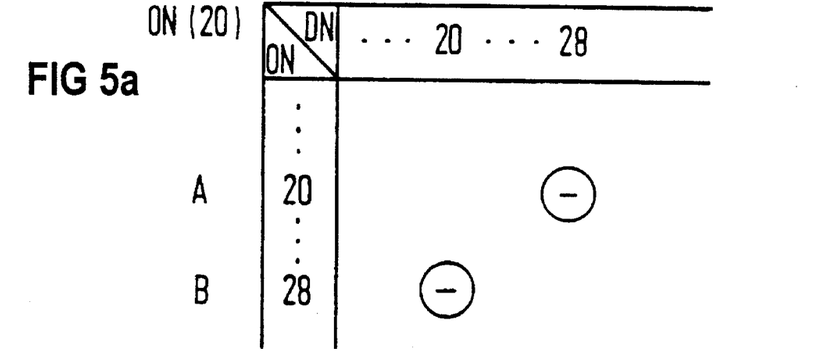
Figure 5B:
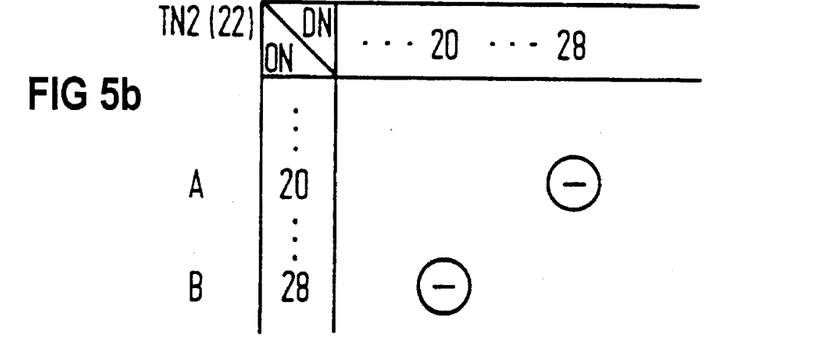
Figure 5C:
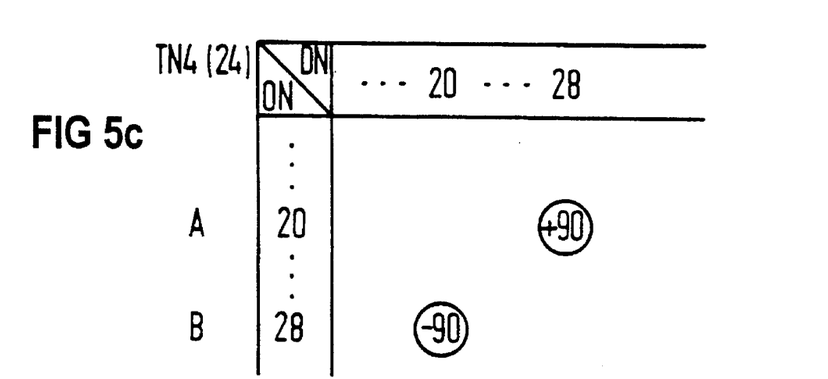
Figure 5D:
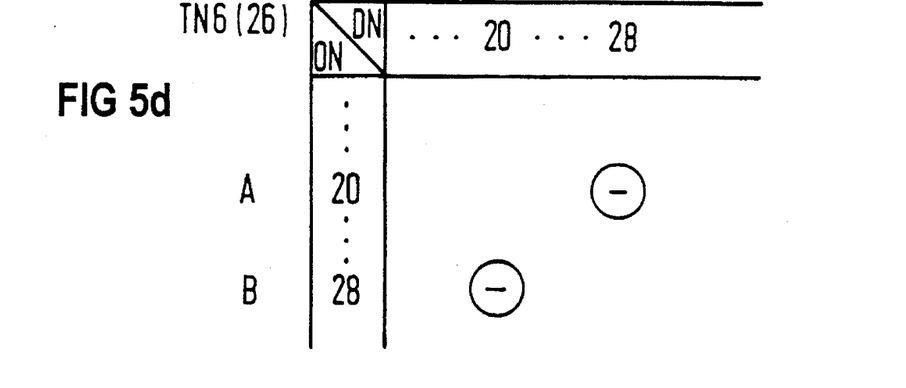
Figure 5E:
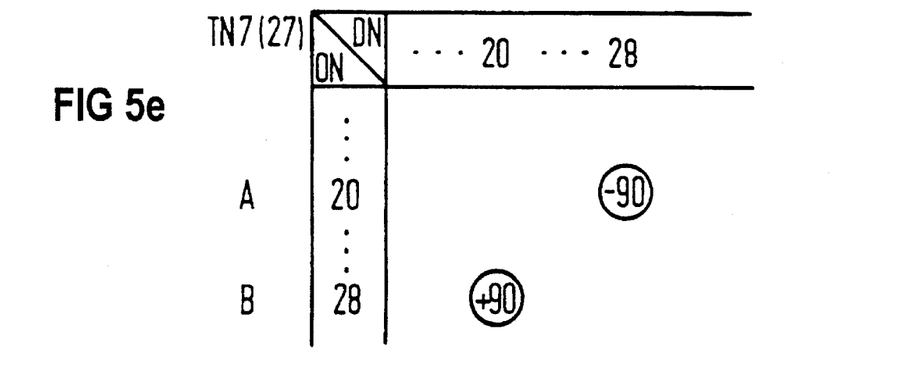
Figure 5F:
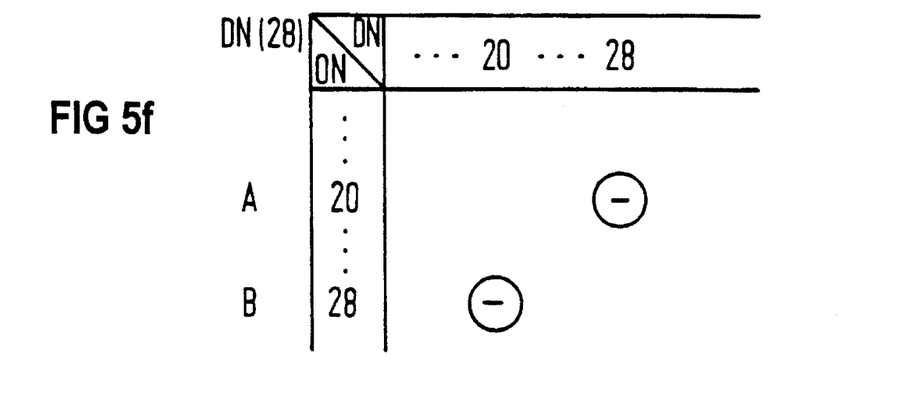

It is now assumed that the signalling information of the telecommunication connection to be set up, which contains the A call number 1234 supplemented by the area identity number "90", is routed from the transit node TN6 to the transit node TN7. This node lies together with the following destination node DN (28) in the area which is assigned the same identity number "90", just like the origin node (20). The node TN7 is additionally neighboring a node (TN6) of open numbering. The call number modification table assigned to the node TN7 is represented in FIG. 5e). At the crossing point of the row (ON="20" and the column DN="28", the call number modification value "–90" is indicated. Consequently, the A call number 1234 contained in the signalling information and originally supplemented by the area identity number "90" is abbreviated by this area identity number "90". In the destination node DN (28), the A call number is not modified (FIG. 5f, row "20", column "28").

Thus, the A call number 1234, which finally is unchanged due to supplementing and abbreviating by the same area identity number "90", is fed to the telecommunication terminal equipment on the reception side B, where it is available for indication on the display DPLB or for the implementation of other facilities. The A call number is thus made available to the terminal equipment on the reception side irrespective of the nodes of open numbering passed through.

The return signalling of the B call number from the terminal equipment B to the terminal equipment A takes place in an analogous way, again noting that the "destination node" (28) of the setup of the connection is identical to the "origin node" (28) of the return signalling and that the "origin node" (28) of the setup of the connection is identical to the "destination node" (20) of the return signalling. The return signalling takes place via the nodes (20-22-24-26-27-28) involved in the setup of the connection, although in the reverse order (28-27-26-24-22-20). The controls of the nodes involved in the return signalling carry out the checks described in conjunction with the setup of the connection and in each case consult the call number modification tables stored in the nodes (FIGS. 5f, 5e, 5d, 5c, 5b and 5a: row "28", column "20"). It follows that the B call number contained in the (return) signalling information is abbreviated in the node TN7 (27) by the area identity number "90". Both nodes TN7 and TN4 lie in an area of closed numbering and are neighbored on the "outgoing" side (TN7) or on the "incoming" side (TN4) by nodes of open numbering. Here this is the same node TN6. Thus, the B call number 5678, which finally is unchanged due to supplementing and abbreviating by the same area identity number "90", is fed to the telecommunication terminal equipment on the transmission side A, where it is available for indication on the display DPLA or for the implementation of other facilities. The B call number is thus made available to the terminal equipment on the transmission side irrespective of the route actually taken.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A process for signalling a call number in a telecommunication network, telecommunication connections being directed from a telecommunication terminal equipment on a transmission side via an origin node, via transit nodes and a destination node to a telecommunication terminal equipment on a reception side, the origin node being arranged in an area of closed numbering and there being inserted into first signalling information, of the telecommunication connection to be set up, a node number designating the origin node, a call number of the telecommunication terminal equipment on the transmission side, a node identity number assigned to the telecommunication terminal equipment on the reception side and a call number of the telecommunication terminal equipment on the reception side, comprising the steps of:

checking in nodes involved in a setup of the connection on the basis of the node number of the origin node and on the basis of the node identity number of the destination node whether the call number of the telecommunication terminal equipment on the transmission side is to be modified;

supplementing the call number of the telecommunication terminal equipment on the transmission side in a node in an area of closed numbering which neighbors an area of open numbering by an area identity number designating the area of closed numbering; and not supplementing the call number of the telecommunication terminal equipment on the transmission side in nodes of open numbering following the area of closed numbering.

2. The process as claimed in claim 1, wherein, after the setup of the telecommunication connection from the telecommunication terminal equipment on the transmission side to the telecommunication terminal equipment on the reception side, second signalling information is formed, which is transmitted from the telecommunication terminal equipment on the reception side to the telecommunication terminal equipment on the transmission side with the call number of the telecommunication terminal equipment on the reception side, wherein in the nodes involved in the setup of the connection it is checked on the basis of the node identity number of the destination node and on the basis of the node identity number of the origin node whether the call number of the telecommunication terminal equipment on the reception side is to be modified, and wherein the call number of the telecommunication terminal equipment on the reception side is supplemented in the destination node, representing the second signalling information, provided that the destination node is a node of open numbering, by the node identity number designating the destination node and is not supplemented in the nodes following the destination node with respect to the second signalling information.

3. The process as claimed in claim 1, wherein, provided that the origin node and the destination node are assigned to a first area having a first area identity number and a second area also having said first area identity number, respectively, and provided that there is at least one further area having a second area identity number arranged between the origin and destination nodes, the first signalling information with the call number of the telecommunication terminal equipment on the transmission side, supplemented by the first area identity number of the origin node, is abbreviated in the destination node, or in a node preceding the destination node and assigned to the second area of the destination node, by the first area identity number of the origin node.

4. The process as claimed in claim 3, wherein, after the setup of the telecommunication connection from the telecommunication terminal equipment on the transmission side to the telecommunication terminal equipment on the reception side, a second signalling information is checked in the nodes involved in the setup of the connection on the basis of the area identity number of the destination node and on the basis of the area identity number of the origin node to ascertain whether the call number of the telecommunication terminal equipment on the reception side of a call is to be modified; and wherein the call number of the telecommunication terminal equipment on a new transmission side, that was previously the reception side, is not modified in the transmission of the second signalling information such that the call number of the telecommunication terminal equipment on the new transmission side is routed to the telecommunication terminal equipment on a new reception side, that was previously the transmission side, with abbreviations or supplements.

5. An arrangement for signalling a call number in a telecommunication network, telecommunication connections being directed from telecommunication terminal equipment on a transmission side via an origin node, via transit nodes and a destination node to telecommunication terminal equipment on a reception side, the origin node being arranged in an area of closed numbering and there being inserted into first signalling information, of the telecommunication connection to be set up, a node number designating the origin node, a call number of the telecommunication terminal equipment on the transmission side, a node identity number, assigned to the telecommunication terminal equipment on the reception side, and a call number of the telecommunication terminal equipment on the reception side, comprising:

means for checking in nodes involved in a setup of the connection on the basis of the node number of the origin node and on the basis of the node identity number of the destination node whether the call number of the telecommunication terminal equipment on the transmission side is to be modified; and means for supplementing the call number of the telecommunication terminal equipment on the transmission side in a node in an area of closed numbering which neighbors an area of open numbering by an area identity number designating the area of closed numbering, and not supplementing the call number of the telecommunication terminal equipment on the transmission side in nodes of open numbering following the area of closed numbering.

6. A process for signalling a call number in a telecommunication network, telecommunication connections being directed from a telecommunication terminal equipment on a transmission side via an origin node, via transit nodes and a destination node to a telecommunication terminal equipment on a reception side, the origin node being arranged in an area of closed numbering and there being inserted into first signalling information of the telecommunication connection to be set up a node number designating the origin node, a call number of the telecommunication terminal equipment on the transmission side, a node identity number assigned to the telecommunication terminal equipment on the reception side, and a call number of the telecommunication terminal equipment on the reception side, comprising the steps of:

- checking in nodes involved in a setup of the connection on the basis of the node number of the origin node and on the basis of the area identity number of the destination node whether the call number of the telecommunication terminal equipment on the transmission side is to be modified;
- supplementing the call number of the telecommunication terminal equipment on the transmission side in a node in an area of closed numbering which neighbors an area of open numbering by an area identity number designating the area of closed numbering;
- not supplementing the call number of the telecommunication terminal equipment on the transmission side in nodes of open numbering following the area of closed numbering;
- abbreviating, provided that the origin node and the destination node are assigned to a first area having a first area identity number and a second area also having said first area identity number, respectively, and provided that there is at least one further area having a second area identity number arranged between the origin and destination nodes, the first signalling information with the call number of the telecommunication terminal equipment on the transmission side, supplemented by the first area identity number of the origin node, in the destination node, or in a node preceding the destination node and assigned to the second area of the destination node, by the first area identity number of the origin node;
- checking, after the setup of the telecommunication connection from the telecommunication terminal equipment on the transmission side to the telecommunication terminal equipment on a reception side, the second signalling information in the nodes involved in the setup of the connection on the basis of the area identity number of the destination node and on the basis of the area identity number of the origin node to ascertain whether the call number of the telecommunication terminal equipment on the reception side of a call is to be modified; and
- not modifying the call number of the telecommunication terminal equipment on a new transmission side, that was previously the reception side, in a transmission of the second signalling information such that the call number of the telecommunication terminal equipment on the new transmission side is routed to the telecommunication terminal equipment on a new reception side, that was previously the transmission side, with abbreviations or supplements.

* * * * *